United States Patent
Schneid et al.

[11] Patent Number: 5,851,168
[45] Date of Patent: Dec. 22, 1998

[54] ROLL FOR A ROLLING MECHANISM

[75] Inventors: Josef Schneid, Vogt; Herbert Brandiser, Mochenwangen, both of Germany

[73] Assignee: Voith Sulzer Finishing GmbH, Germany

[21] Appl. No.: 786,882

[22] Filed: Jan. 23, 1997

[30] Foreign Application Priority Data

Feb. 1, 1996 [DE] Germany ............ 196 03 651.8

[51] Int. Cl.$^6$ .................................................. B21B 13/02
[52] U.S. Cl. ............................... 492/7; 492/16; 492/20
[58] Field of Search ..................... 492/7, 16, 20

[56] References Cited

U.S. PATENT DOCUMENTS

| 4,000,979 | 1/1977 | Biondetti . |
| 4,680,843 | 7/1987 | Junk et al. . |
| 4,691,421 | 9/1987 | Schiel . |

FOREIGN PATENT DOCUMENTS

| 0241442 A2 | 10/1987 | European Pat. Off. . |
| 0 377 655 B1 | 7/1990 | European Pat. Off. . |
| 0447651 A1 | 9/1991 | European Pat. Off. . |
| 2507677 C3 | 8/1976 | Germany . |
| 30 03 396 C2 | 8/1981 | Germany . |
| 30 25 799 A1 | 1/1982 | Germany . |
| 3025799 A1 | 2/1982 | Germany . |
| 33 48 209 C2 | 1/1985 | Germany . |
| 3532843 C2 | 4/1987 | Germany . |
| 36 23 028 C3 | 1/1988 | Germany . |
| 9105073.1 | 8/1991 | Germany . |
| 40 15 245 C2 | 9/1991 | Germany . |
| 43 05 371 C2 | 9/1994 | Germany . |
| 4305371 A1 | 9/1994 | Germany . |
| 2068505 | 8/1981 | United Kingdom . |
| 2098304 | 11/1982 | United Kingdom . |
| 2143302 | 2/1985 | United Kingdom . |

Primary Examiner—I. Cuda
Attorney, Agent, or Firm—Wolf, Greenfield & Sacks, P.C.

[57] ABSTRACT

A roll for a rolling mechanism includes a carrier and a roll jacket surrounding the latter which is rotatably journalled on the carrier by bearings arranged at a distance from another. Hydrostatic and/or hydrodynamic support elements are provided between the bearing by which the roll jacket is additionally supported on the carrier. The roll jacket is furthermore braced on the carrier via at least one outer hydrostatic and/or hydrodynamic support element arranged axially outside of the zone bounded by the bearings

19 Claims, 3 Drawing Sheets

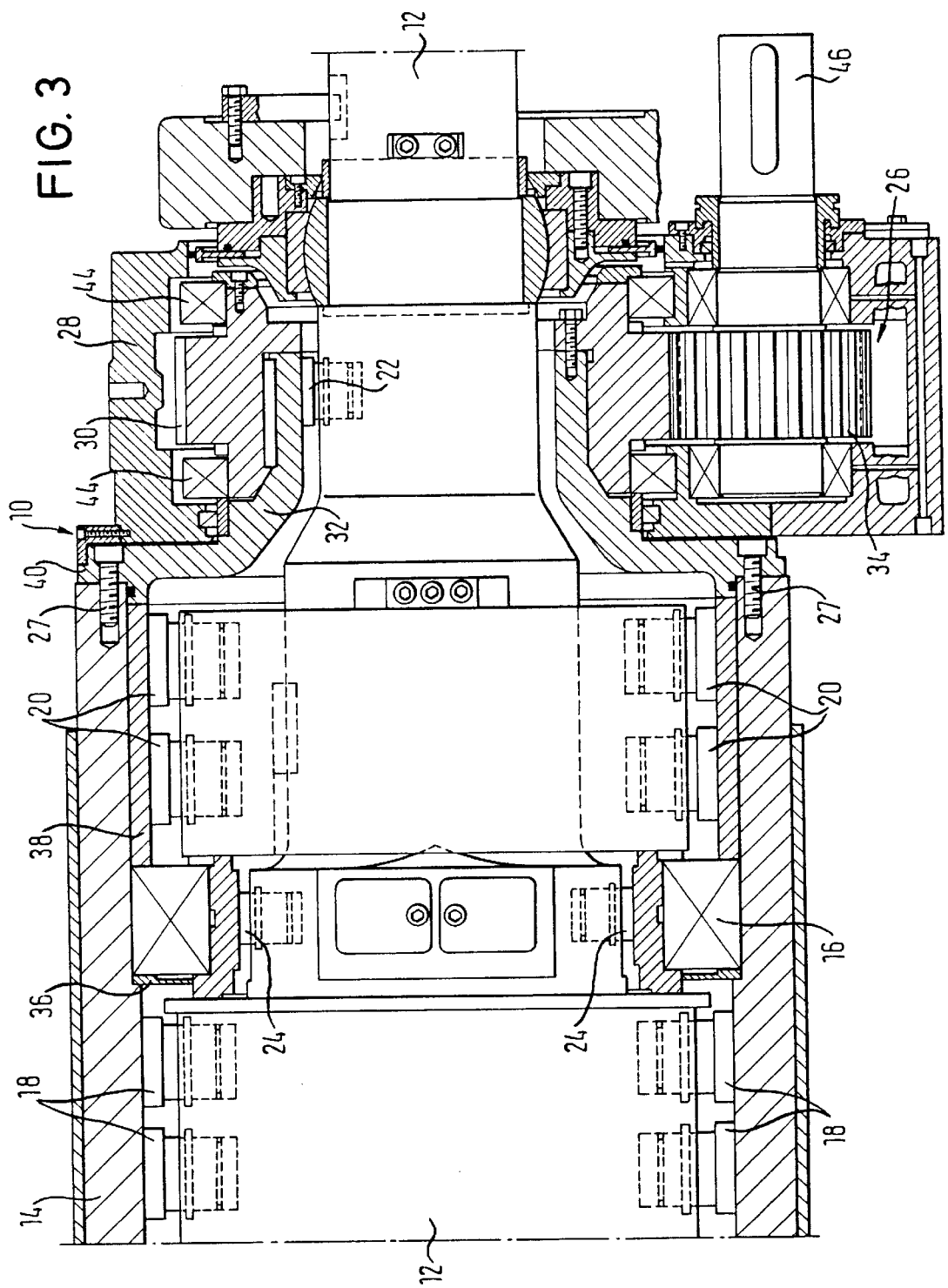

ROLL FOR A ROLLING MECHANISM

FIELD OF THE INVENTION

The invention relates to a roll for a rolling mechanism comprising a carrier, a roll jacket surrounding the carrier and rotatably journalled on the latter by two coaxial bearings arranged at a distance from one another, and also inner hydrostatic and/or hydrodynamic support elements by which the roll jacket is additionally supported on the carrier and which are in particular provided between the two coaxial bearings.

A roll of this kind can for example be used in a rolling mill for the treatment of webs of fiber material such as in particular paper, card or the like. In this arrangement the web of fiber material is guided through a press gap between the roll jacket and a counter-surface, in particular that of a counter-roll.

PRIOR ART

In the previously known rolls of the initially named kind the roll jacket is rotatably journalled at its two ends and is additionally supported on the carrier only by support elements arranged between two outer rotary bearings. These known rolls have the disadvantage that it is only possible to influence the ends of the roll jacket by these support elements.

OBJECT OF THE INVENTION

The invention is based on the object of providing a roll of the initially named kind, of which the roll jacket can in particular also be appropriately loaded at the two ends, having regard to an ideal adaptation to the respective operating conditions.

BRIEF SUMMARY OF THE INVENTION

This object is satisfied in accordance with the invention in that at least one device for force generation is provided at at least one side of the zone bounded by the bearings in order to load and/or to relieve the roll jacket. In this respect the roll jacket is preferably pressed against the carrier by at least one outer hydrostatic and/or hydrodynamic support element arranged axially outside of the zone bounded by the bearings.

As a result of this design a situation is achieved in which the roll can also be loaded outside of the zone defined by the bearings in such a way that an ideal situation is achieved having regard to the respective operating conditions. Thus, by way of example, the force with which a respective outer support element is pressed against the inner circumference of the roll jacket can be set in the desired manner. This can for example be of advantage when influencing the deflection and also when producing a setting movement of the roll jacket. Moreover, through an appropriate choice of the temperature of the lubricating oil supplied in the area of a relevant outer support element it is also possible to achieve an ideal temperature influence on the marginal regions having regard to the respective operating conditions. As a result, it is thus possible to exert a substantially greater influence in the marginal region of the web of material.

The roll jacket can be driven at one end via a transmission which is received in an axially outer transmission housing rotatably journalled on the roll jacket or on a tubular extension of the roll jacket and also rotationally fixed relative to the carrier or to the roll frame. In this case at least one outer support element is advantageously provided in the region of the transmission housing. As a result an ideal compensation of the weight of the transmission is possible. Moreover, the possibility exists of introducing forces to influence the bending deflection of the roll jacket relatively far outwards. Fundamentally, however, at least one such support element can also be provided at the opposite, transmission-less end of the roll.

Further advantageous variants of the roll of the invention are set forth in the subordinate claims.

BRIEF DESCRIPTION OF THE DRAWINGS

The invention will be described in more detail in the following with reference to examples and to the drawing in which are shown.

DESCRIPTION OF PREFERRED EMBODIMENTS

Figure 1:
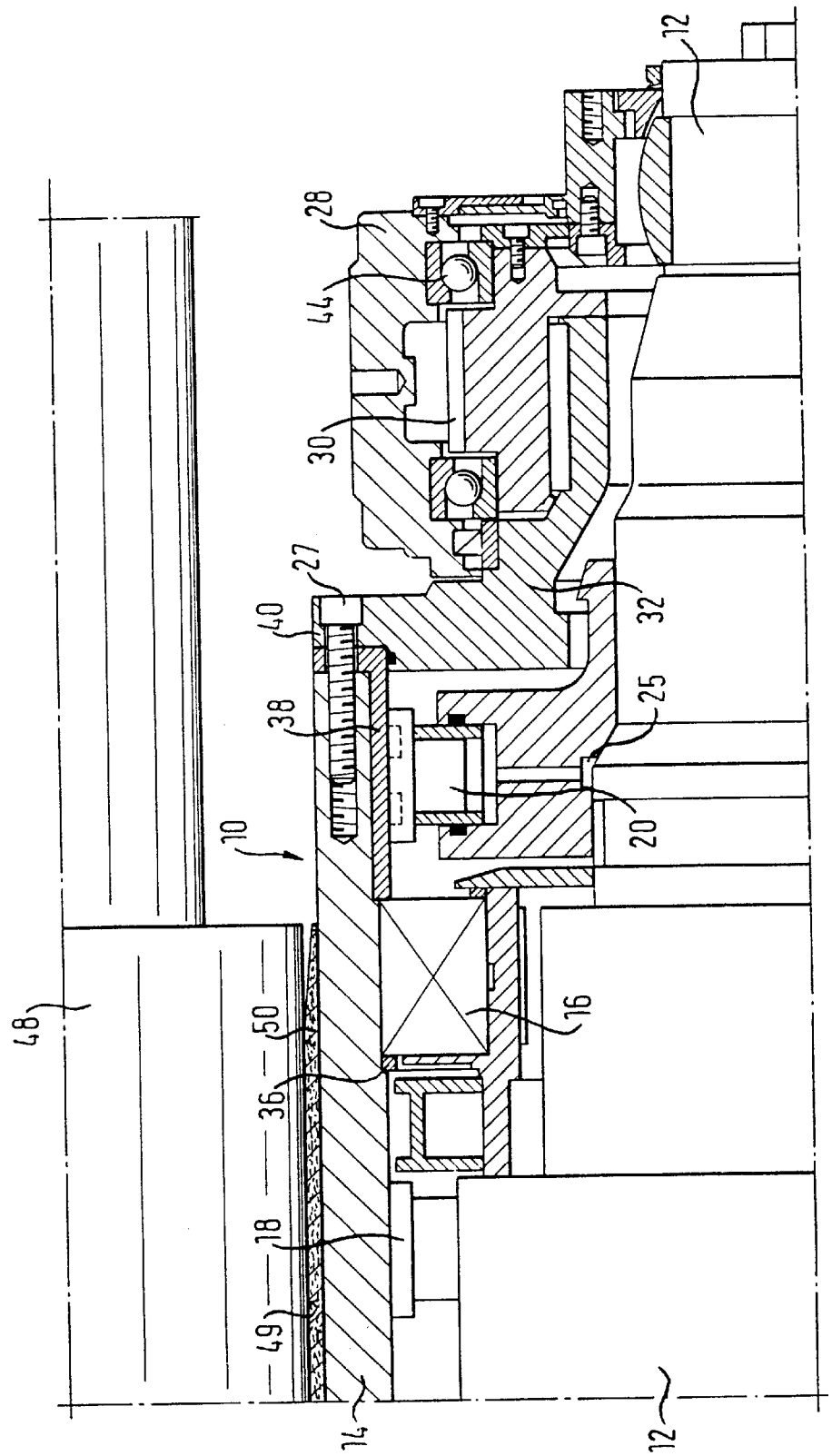
FIG. 1 a schematic partly sectioned view of part of an embodiment of the roll co-operating with a counter-roll, FIG. 2 an illustration comparable to FIG. 1 of a further embodiment of the roll, and FIG. 3 a representation comparable with FIG. 1 of a further embodiment of the roll.

The roll 10 shown in FIG. 1 comprises a stationary carrier 12 and also a roll jacket 14 which surrounds the carrier 12. The roll jacket 14 is rotatably journalled by two coaxial bearings 16 (only one shown) on the carrier 12 which are arranged spaced apart from one another. These coaxial bearings 16 can also be designed in any desired manner. Thus it is for example conceivable to use roller bearings, hydrodynamic bearings, hydrostatic bearings or the like.

Between the two coaxial bearings 16 there are preferably provided a plurality of inner support elements 18 arranged in series in the axial direction. These can be hydrostatic and/or hydrodynamic support elements, i.e. support elements with a hydrostatic or hydrodynamic lubrication. Through these inner support elements 18, i.e. these support elements arranged between the two coaxial bearings 16, the roll jacket 14 is additionally supported on the stationary carrier 12.

Furthermore, the roll jacket 14 is supported on the carrier 12 via at least one outer support element 20 arranged outside of the zone bounded by the bearings 16. This support element can also be a hydrostatic and/or hydrodynamic support element.

At least one outer support element 20 is preferably provided at each of the two sides of the zone bounded by the coaxial bearings 16.

As can be recognized from FIG. 1 the illustrated outer support element 20 is arranged in the region of the right hand end of the roll jacket 14 radially between its internal peripheral surface and the stationary carrier 12. The outer support element 20 which is pressed in the manner of a piston against the inner peripheral surface of the roll jacket 14 is supplied with a pressure fluid via a passage 25. The supply of lubricating oil can also take place independently of the support element 18. The supply of lubricating oil via the relevant pressure space is however fundamentally conceivable.

In all the embodiments the roll jacket 14 is driven at the right hand end via a transmission 26. This transmission 26 is received in an axially outer transmission housing 28 rotatably journalled on the roll jacket 14 and supported by means of a torque stay 42 (see FIG. 2). This transmission housing 28 is thus rotationally fixed relative to the carrier 12.

The transmission 26 comprises a gear wheel 34 which meshes with a toothed arrangement 30 fixedly connected to the roll jacket 14. In the illustrated embodiments this tooth arrangement 30 is provided on a built-on part 32 which is secured to the right hand end of the roll jacket 14 via bolts 27.

In the embodiment shown in FIG. 1 the outer support element 20 is axially arranged between the transmission housing 28 and the relevant bearing 16. The bearing 16 is axially secured by an abutment 36 and by a sleeve 38 inserted from the right hand side into the roll jacket 14. The sleeve 38 is secured together with the built-on part 32 to the roll jacket 14 by the bolts 27, with the bolts 27 passing both through a flange 40 of the built-on part 32 and also through a flange of the sleeve 38.

As can be recognized from FIG. 1 the outer support element 20 is pressed by the pressure fluid supplied via the passage 25 against the inner peripheral surface of the sleeve 38 and via the latter against the inner peripheral surface of the roll jacket 14.

Figure 2:
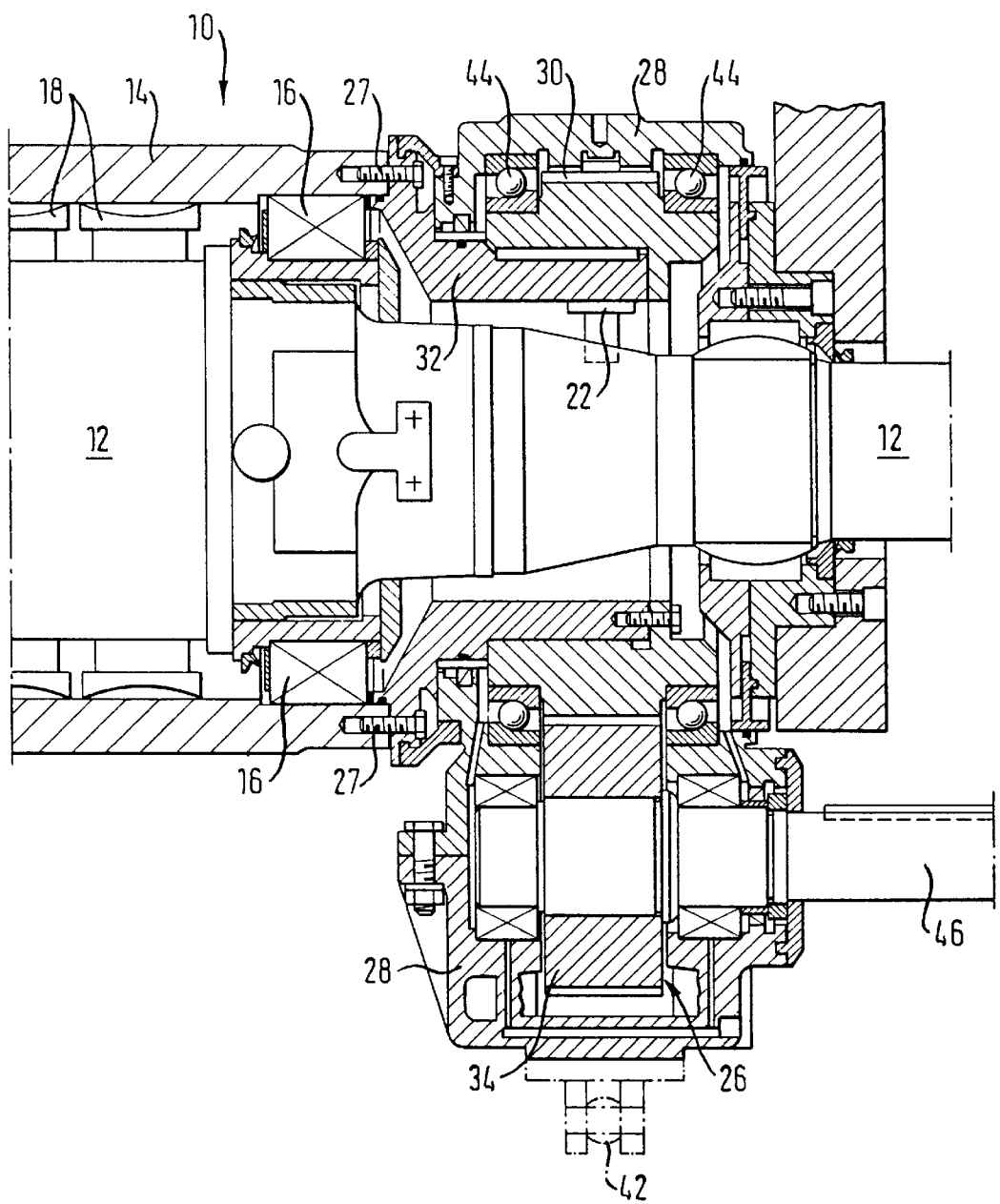

In the variant showing in FIG. 2 the roll jacket 14 extends, in comparison to the embodiment of FIG. 1 only fractionally beyond the bearing 16 to the right. The outer support element 22 is no longer arranged axially between the transmission housing 28 or the built-on part 32 and the bearing 16, but rather radially directly between the built-on part 32 carrying the transmission housing 28 and the stationary carrier 12.

The transmission housing 28 is rotatably journalled in the illustrated variants on the built-on part 32 via bearings 44. The gear wheel 34 which meshes with the toothed arrangement 30 is driven via a shaft 46 (see FIG. 2) which is parallel to the roll jacket 14 but extends in the opposite direction, i.e. in the present case to the right.

In the illustrated embodiment the roll jacket 14 together with the transmission can be radially displaceable or also radially fixed relative to the stationary carrier 12. With the radially displaceable embodiment it can be sensible to provide force elements under the bearing 16 in order to load and/or to relieve the roll jacket at this position.

The roll jacket 14 of the roll 10 co-operates with a counter-roll 48 in order to form a press gap 49 therebetween through which a fiber web 50 to be treated is passed (see FIG. 1).

FIG. 3 shows a further variant of a roll 10.

In this variant the roll 10 again comprises a stationary carrier 12 and also a roll jacket 14 surrounding the carrier 12, with the roll jacket 14 being rotatably journalled on the carrier 12 by two coaxial bearings 16 arranged to the distance from one another. Between the two coaxial bearings there are in turn provided a plurality of inner support elements 18 which lie in series in the axial direction and through which the roll jacket 14 is additionally braced against the stationary carrier 12.

Two additional, radially inwardly disposed bearing support elements 24 are associated with the illustrated right hand bearing 16 and make it possible to generate an additional pressure away from the carrier 12 in and/or against the pressing direction of the roll 10.

Furthermore the roll jacket 14 is braced against the carrier 12 via a plurality of outer support elements 20, 22 arranged axially outside of the zone bounded by the coaxial bearings 16. These support elements can also be hydrostatic and/or hydrodynamic support elements.

In the embodiment shown in FIG. 3 two upper and two lower support elements 20 are provided which are arranged in the region of the right hand end of the roll jacket 14 radially between its inner peripheral surface and the stationary carrier 12.

The roll jacket 14 is again driven at the right hand end via a transmission 26 which is received in an axially outer transmission housing 28 which is rotatably journalled on the roll jacket 14. This transmission housing 28 is, as previously, supported by means of a torque stay and thus rotationally fixed relative to the carrier 12. The gear wheel 34 of the transmission 26 again meshes with a toothed arrangement 30, fixedly connected to the roll jacket 14 and provided on a built-on part 32 secured to the right hand end of the roll jacket 14 via bolts 27. In the present case the sleeve 38 is formed in one piece with the built-on part 32.

The outer support elements 20 provided in the region of the right hand end of the roll jacket 14 are arranged axially between the transmission housing 28 and the right hand bearing 16, with the upper and the lower support elements 20 in each case lying axially behind each other. On being pressurized with a pressure fluid these outer support elements 20 are pressed towards the inner peripheral surface of the sleeve 38 and via the latter against the inner peripheral surface of the roll jacket 14.

A further outer support element 22 is provided in addition to the outer support elements 20. This further outer support element 22 is no longer arranged axially between the transmission housing 28 or the built-on part 32 and the right hand bearing, but is instead radially arranged directly between the built-on part 32 carrying the transmission housing 28 and the stationary carrier 12.

Such outer support elements can basically also be provided at the opposite, transmission-less end of the roll.

The transmission housing 28 is again rotatably journalled on the built-on part 32 via bearings 44. The gear wheel 34 which meshes with the toothed arrangement 30 is driven via a shaft 46 which is parallel to the roll jacket 14, but which extends in the opposite direction, i.e. in the present case to the right.

The roll jacket 14 can be radially displaceable together with the transmission 26 or also radially fixed. The bearing support elements 24 provided radially within the bearing 16 are in particular expedient with the radially displaceable embodiment so that the roll jacket can also be relieved or loaded in the region of the bearing 16.

We claim:

1. Roll for a rolling mechanism, comprising:
   a carrier;
   a roll jacket surrounding the carrier and rotatably journalled on the carrier by at least two coaxial bearings, said roll jacket being driven at one end by a transmission which is received in a transmission housing and which is rotatably journalled on at least one of the roll jacket and an extension of the roll jacket, and which is also rotationally fixed relative to at least one of the carrier and the roll frame;
   at least one of an inner hydrostatic support element and an inner hydrodynamic support element by which the roll jacket is additionally supported on the carrier; and
   at least one device provided for force generation on at least one side of a zone bounded by the bearings and comprising at least one of an outer hydrostatic support element and an outer hydrodynamic support element arranged axially outside of the zone bounded by the bearings;
   wherein said force generation device comprises at least one outer support element supported on said carrier and which is one of axially arranged between the axially outer transmission housing and the bearing, and radially arranged between the transmission housing and the carrier.

2. Roll in accordance with claim 1, wherein hydrostatic and/or hydrodynamic support elements are provided between the two coaxial bearings.

3. Roll in accordance with claim 2, wherein the at least one outer support element is provided in the region of at least one end of the roll jacket.

4. Roll in accordance with the claim 1, wherein at least one outer support element is provided in the region of the transmission housing.

5. Roll in accordance with claim 4, wherein the transmission comprises at least one gear wheel which meshes with a toothed arrangement fixedly connected to the roll jacket.

6. Roll in accordance with claim 5, wherein the toothed arrangement is provided on a built-on part which is secured to one end of the roll jacket; and wherein the transmission housing is rotationally journalled on the built-on part.

7. Roll in accordance with claim 6, wherein at least one outer support element is axially arranged between the built-on part and one of the coaxial bearings and is also radially arranged between the roll jacket and the carrier.

8. Roll in accordance with claim 6, wherein at least one outer support element is radially arranged between the built-on part carrying the transmission housing and the carrier.

9. Roll in accordance with claim 1, wherein the roll jacket is radially displaceable relative to the carrier together with the coaxial bearings.

10. Roll in accordance with claim 1, wherein the roll jacket is radially fixed relative to the carrier by means of the coaxial bearings.

11. Roll in accordance with claim 1, wherein at least one coaxial bearing is at least one of a rolling bearing and a bearing unit which is formed by at least three hydrostatic/hydrodynamic bearing elements at least substantially uniformly distributed over periphery of the carrier.

12. Roll in accordance with claim 1, wherein at least one coaxial bearing includes at least one bearing support element for providing additional pressing action in the direction away from the carrier opposite to the pressing direction of the roll.

13. Roll in accordance with claim 6, wherein, in addition to the outer support elements, at least one support element is provided which acts transverse to the pressing direction on the built-on part, in at least one of in the region of the transmission and at a corresponding point at the opposite roll end.

14. Roll in accordance with claim 1, wherein the coaxial bearings are at least one of arranged adjacent to one another without an intermediate support element in the region of the roll center and are combined into a single bearing unit.

15. A roll, comprising:
a carrier;
a roll jacket at least partially surrounding the carrier and rotatably journalled on the carrier, said roll jacket having a distal edge and a proximal edge;
at least one bearing disposed at least partially between the carrier and roll jacket for facilitating rotational movement therebetween, said bearing being disposed in the vicinity of the proximal edge of said roll jacket;
a transmission coupled to the roll jacket in the vicinity of the proximal edge of the roll jacket to provide rotational force to the roll jacket; and
at least one outer support element disposed axially along the carrier between the bearing and the transmission.

16. The roll of claim 15, wherein the outer support element is at least partially disposed between the carrier and the bearing.

17. The roll of claim 15, wherein the outer support element is at least partially disposed between the carrier and the transmission.

18. The roll of claim 15, further comprising a built-on part attached to the proximal end of the roll jacket, and wherein the outer support element is at least partially disposed between the carrier and the built-on part.

19. A roll, comprising:
a carrier;
a roll jacket at least partially surrounding the carrier and rotatably journalled on the carrier, said roll jacket having a distal edge and a proximal edge;
a first bearing disposed at least partially between the carrier and roll jacket for facilitating rotational movement therebetween, said bearing being disposed in the vicinity of the proximal edge of said roll jacket;
a second bearing disposed at least partially between the carrier and roll jacket for facilitating rotational movement therebetween, said bearing being disposed away from the proximal edge of said roll jacket;
at least one inner support element disposed along the carrier between the first bearing and the second bearing;
a transmission, disposed in a transmission housing rotatably journalled on at least one of the roll jacket and an extension of the roll jacket, in the vicinity of the proximal edge of the roll jacket, to provide rotational force to the roll jacket, said transmission being rotationally fixed relative to the carrier; and
at least one outer support element disposed axially along the carrier between the first bearing and the transmission, said outer support element supporting one of the bearings, the transmission, the extension of the roll jacket and the roll jacket.

* * * * *